Fig. 5.

United States Patent Office 3,038,202
Patented June 12, 1962

3,038,202
METHOD AND APPARATUS FOR MAKING MULTIPLE TUBE STRUCTURES BY EXTRUSION
Robert J. Harkenrider, Winona, Minn., assignor, by direct and mesne assignments, to Multiple Extrusions, Inc., Winona, Minn., a corporation of Minnesota
Filed Jan. 28, 1959, Ser. No. 789,614
2 Claims. (Cl. 18—14)

My invention relates to a method and apparatus for making multiple tube structures by extrusion, and more particularly, to a method and apparatus for extruding a product in the form of a plurality of integrally united tubes.

My copending applications Serial No. 418,442, filed March 24, 1954 (now Patent No. 2,908,037, granted October 13, 1959), and Serial No. 554,688, filed December 21, 1955 (of which this application is a continuation-in-part), disclose a method and apparatus for making multiple tube structures by extrusion wherein fluent material is forced simultaneously through a plurality of feed passages into a group of relatively large, looped, distributing passages interconnected throughout the group, and thence through a continuous extruding passage made up of like, generally polygonal, passages having common side portions connected at the corners with adjoining side portions throughout.

As disclosed in said applications, the die for such apparatus is composed of a group of cores of generally polygonal form and cross section, each including a relatively large base portion and a relatively small head portion with a groove forming a waist between the base and head portions, together with pieces framing the group of cores and having generally semi-polygonal recesses with base and head faces separated by waist forming grooves, all corresponding to the base and head portions of the cores and grooves between them, the cores and margin pieces being held together by fastenings that promote easy assembly and ready taking apart for cleaning and service. The disclosures of my said copending applications are hereby incorporated herein by reference in interests of brevity.

This application relates to impropements in the die structure that achieve a more uniform multi-tubular product.

The principal objects of my present invention are to provide a die structure of the type described in said applications wherein the feed passages defined by the cores are shaped to evenly direct the material being extruded to the die extruding passages, wherein the screen portion feed passages and their extensions provided by the cores are proportioned with respect to each other to insure a substantially uniform fluid flow to all the die extruding passages across the face of the die, and to provide a die arrangement in which the cores themselves define the perimeter of the extruded products.

A further important object of the invention is to provide a method of distributing the flow of material being extruded to the extruding passages which involves the consideration of not only the material volume requirements based on cross section of the product, but also the compensation required to account for flow impedance of the material being extruded to and through the die.

Other objects, uses and advantages will be obvious or become apparent from a consideration of the following detailed description and the application drawings.

However, these drawings and the corresponding description are for the purpose of illustrative disclosure and are not intended to impose unnecessary limitations on the appended claims.

*General Description*

Figures 1, 2:
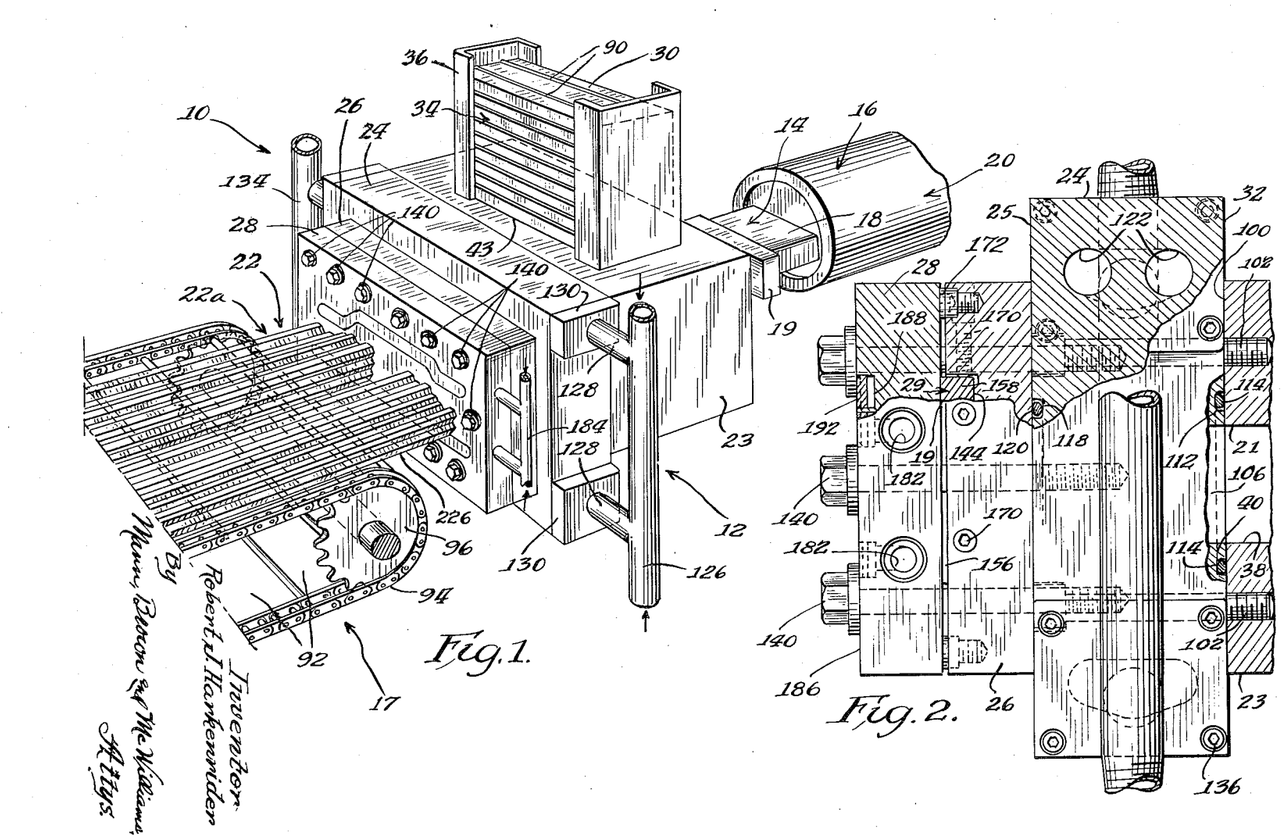
FIGURE 1 is a perspective view diagrammatically illustating apparatus that may be employed to practice my invention.
FIGURE 2 is a side elevational view of the die structure shown in FIGURE 1, parts being broken away to facilitate illustration.

Reference numeral 10 of FIGURE 1 generally indicates the illustrated embodiment of the invention which includes a die 12, a ram 14 for forcing the material to be extruded through the die, power means 16 for actuating the ram, and a slant-type conveyor 17 on which the product 22 is received from the die structure.

The power means 16 in the illustrated embodiment includes a suitable hydraulically operated cylinder 20 mounted and actuated in any suitable manner, from which piston rod 18 is forced to move ram head 19 into the compression chambers 21 (see FIGURE 2) of die body portion 23.

Figure 3:
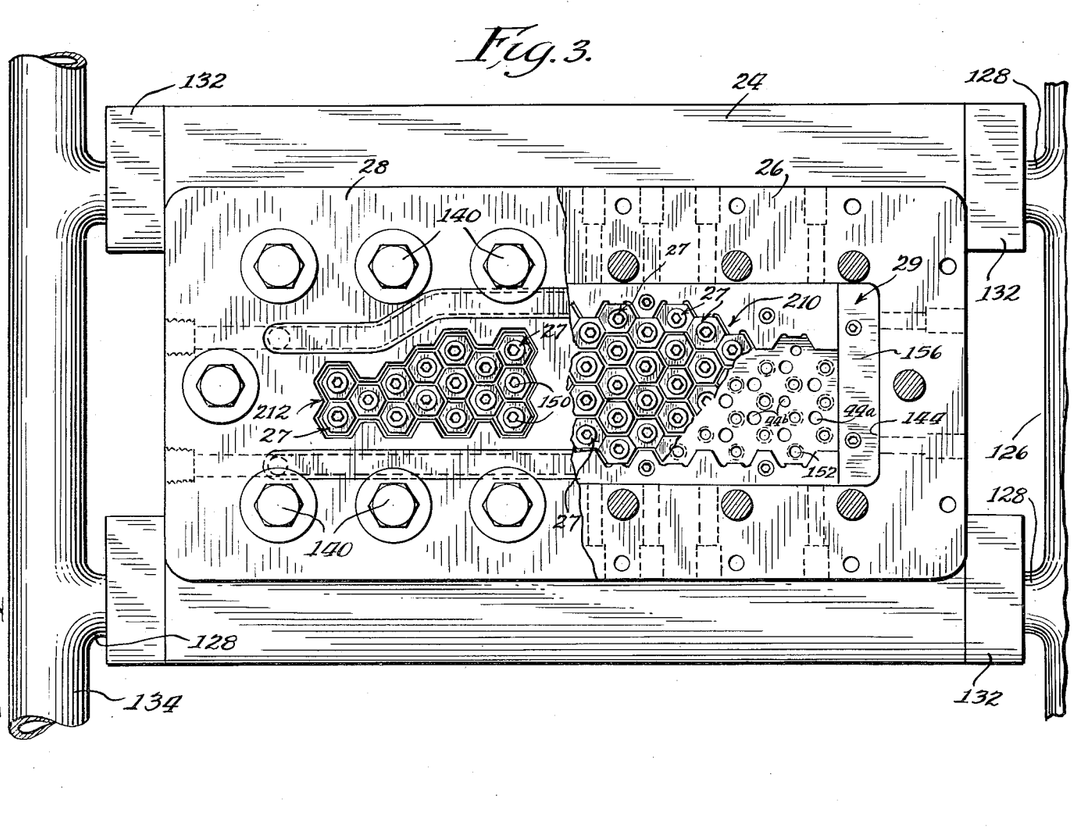
FIGURE 3 is a front elevational view of the die structure shown in FIGURE 1, with parts broken away.

The die structure 12 generally comprises the body portion 23 having secured to the front or downstream face 100 thereof a main mounting plate 24 that in turn carries at its front face 25 a distributor or screen plate 26 on which the individual cores 27 (see FIGURE 3) and marginal pieces, generally indicated at 29, are mounted. Secured to the front face of the distributor or screen plate 26 is the retainer plate 28.

Figure 4:
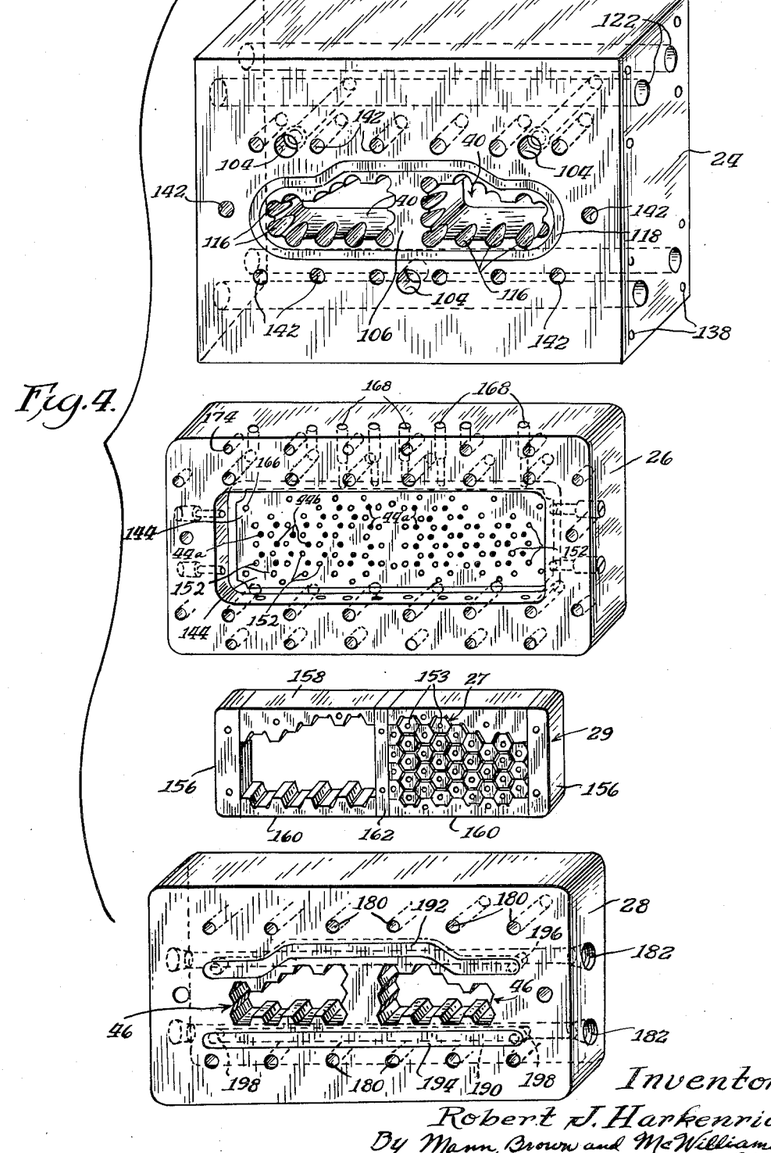
FIGURE 4 is an isometric view of the principal components forming the die structure shown in FIGURES 2 and 3, looking from the front or near side of the showing of FIGURE 1.
Figure 5:
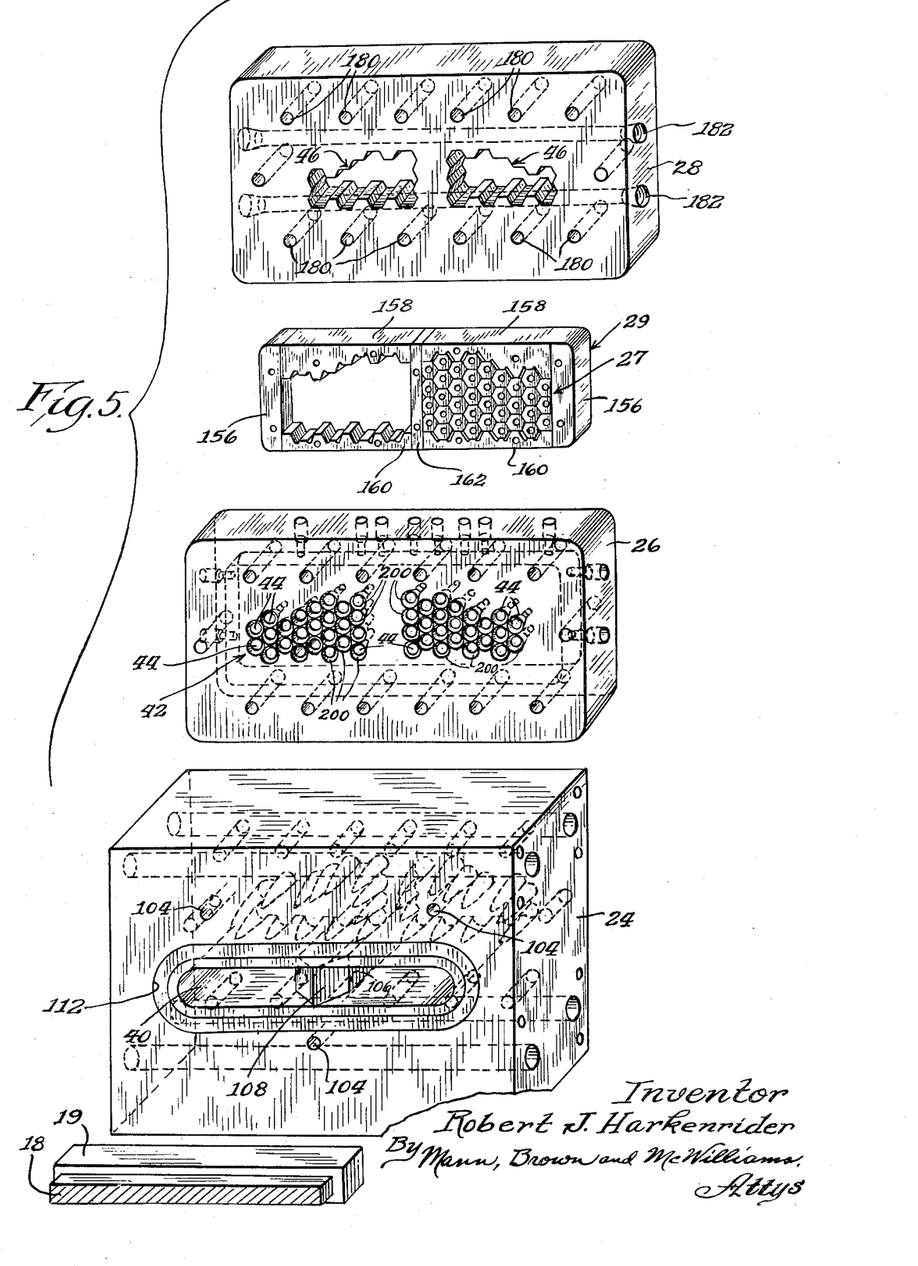
FIGURE 5 is a view similar to that of FIGURE 4, but looking from the opposite side of the die structure and illustrating the relationship of the extruding apparatus ram head to the die structure.

The mounting plate 24, the screen plate 26, the retainer plate 28, the core elements 27 and the marginal pieces 29 have, in general, the structural configurations diagrammatically illustrated in FIGURES 4 and 5. Generally speaking, when hydraulic cylinder 20 is actuated to move ram head 19 into compression chamber 21, the ram head 19 engages a block or billet 30 (see FIGURE 1) of the material that is to be extruded (that has been supplied to the chamber 21), and presses the block or billet 30 through the compression chamber and toward the rear face 32 of the main mounting plate 24. At the end of the stroke of the ram head 19, it is withdrawn by the cylinder 20 to permit the next block 30 in the stack 34 that is retained by channels 36 for guidance into the compression chamber 21 to drop into engagement with the bottom floor 38 of the compression chamber. The ram head 19 is then again moved forwardly to press the second block or billet 30 against the leading material to be extruded. With repeated operations of ram head 19, the result is that the material being extruded plasticizes or fluidizes under heat and pressure as it approaches the plate 24. The plate 24 is formed with an opening 40 into which the material being extruded is forced under the action of the ram, the opening 40 forming a continuation of the compression chamber 21 and being substantially coextensive with a screen portion 42 of screen plate 26. The screen portion 42 is defined by a plurality of feed passages 44 which extend from the rear side thereof to the front side thereof and which receive the material being extruded from passage 40 and supply it to the core elements 27 (in the showing of FIGURE 4, the feed holes are darkened to better indicate their positioning). The material being extruded emerges from the core elements 27 in the shape diagrammatically illustrated in FIGURE 1, the front retainer plate being formed with openings 46 to permit the extruded products to pass to the conveyor 17.

In the illustrated embodiment of the invention, the screen portion 42 and the cores 27 have been formed to define a multi-tubular product of equilateral hexagon configuration but the principles of the invention may be applied regardless of the polygonal configuration adopted, though that illustrated lends itself readily to the construction of the cores and other components making up the die.

As described in the above identified applications, the individual core elements 27 each comprise a relatively large base portion 50 (see FIGURES 11-14) and a relatively small head portion 52, both of equilateral hexagon configuration. In each core, the base portion 50 and the head portion 52 are separated by a waist portion 54. Alternate corners 57 of the base portion 50 of each core 27 appearing at the center of the group of cores (see FIGURE 10) are cut away to form feed grooves 56 that lead to the waist portions 54. As described in my application Serial No. 554,688, the feed grooves 56 preferably diverge toward the head portion 52 as well as the other alternate corners 58. The centrally disposed cores, which are marked 27a, thus have a configuration best shown in FIGURES 11-14.

This configuration includes the planar faces 60 of the base portion 50, the planar faces 62 of the head portion 52, the feed grooves 56 including curved walls 64 and 66 which merge into generally planar surfaces 68 that in turn merge into the rounded surfaces 70 which in part define the waist portion 54.

The rounded surfaces 64 are struck on an arc of a circle and the surfaces 64 of adjacent center cores 27a together define extensions 65 (see FIGURE 10) of feed passages 44 of the screen plate.

Preferably, the surfaces 68 merge into each other in a straight line 72, and, as described in said application Serial No. 554,688, are so formed to define a ridge 74 that tapers outwardly in the direction of the head portion 52 from the forward end of the adjacent rounded surface 64.

Figure 10:
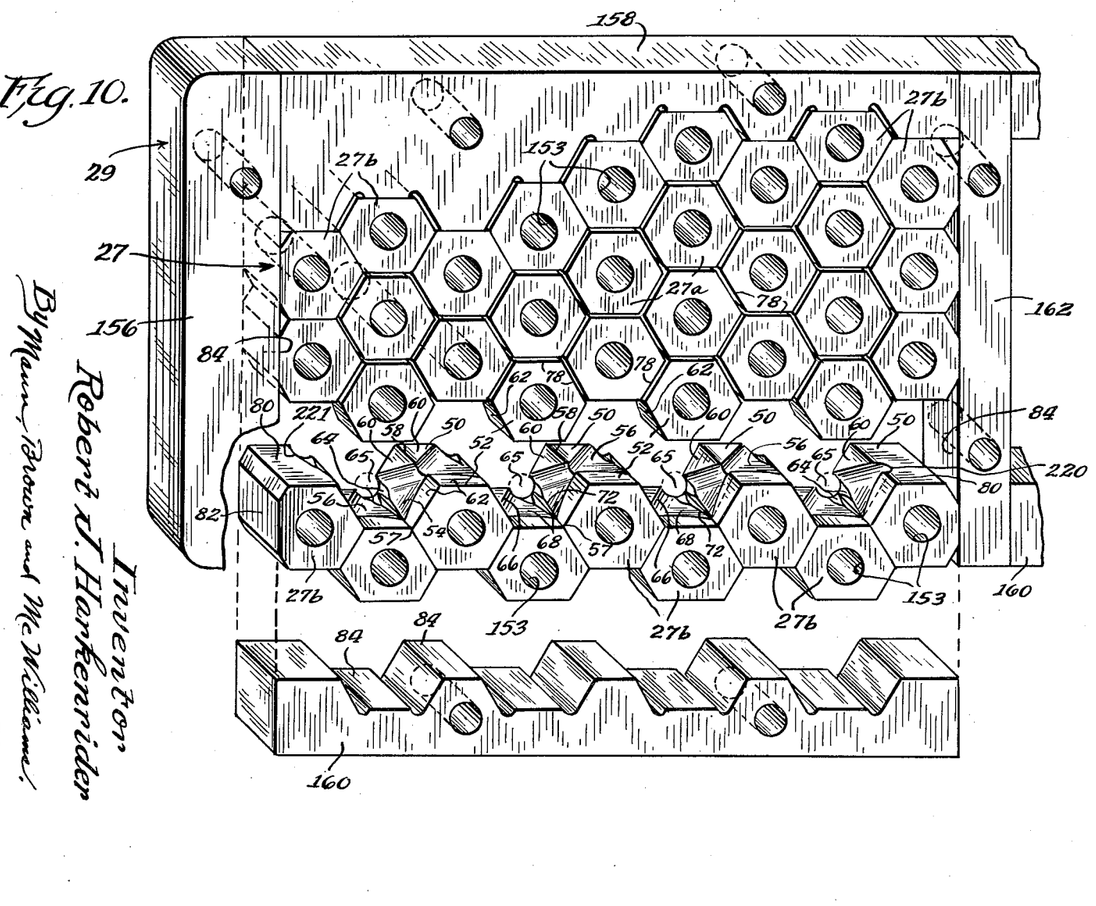
FIGURE 10 is an isometric view of the structure shown in FIGURE 7, more particularly illustrating in a diagrammatic manner the configurations of the various die core members and associated structures.
Figure 11:
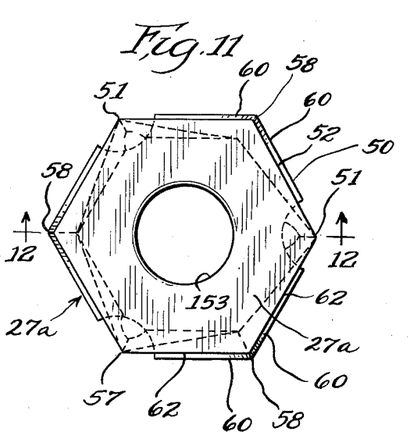
FIGURE 11 is a front plan view of one of the central core members shown in FIGURES 7 and 10.
Figure 12:
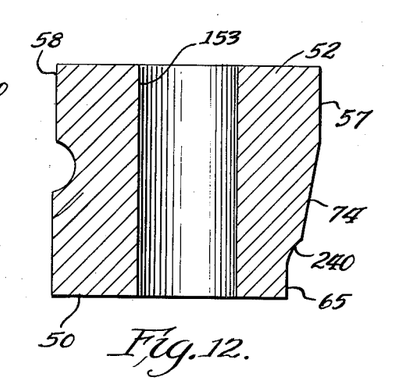
FIGURE 12 is a cross-sectional view along line 12—12 of FIGURE 11.

The inner or central cores 27a when assembled as shown in FIGURE 10, define feed passage extensions 65 which supply the material being extruded from the screen plate feed passages 44 to the relatively large continuous looped storage and supply passages 76 that are defined by adjacent waist portions 54 and which supply the material being extruded to the continuous, generally polygonal tube-forming or extrusion passages 78 defined by the core head end faces 62.

The illustrated core structure also includes border, perimeter, or marginal cores 27b which are formed to define with adjacent cores 27a the perimeter of the extruded product. In the showing of FIGURE 10, the surfaces of the border or marginal core 27b that correspond to the surfaces of cores 27a are given identical reference numerals. In addition, these border cores are provided with planar surfaces 80 which extend the length of the respective cores and which are in abutting relation when the cores are in assembled position to confine the flow of the material being extruded to the shape desired about the perimeter thereof. The border cores 27b are also provided with planar surfaces 82 that are engaged by corresponding surfaces 84 of the marginal pieces generally indicated at 29. It thus will be seen that the cores 27 have been formed to completely define the product, the marginal pieces being provided merely for bracing purposes.

A further important feature of my present invention resides in the formation and proportionment of the screen plate feed passages 44 and the core feed grooves that they are connected to. Heretofore, the cross-sectional area of feed passages 44 has depended only upon the volume of material required in the portion of the extruded product that is fed by the particular feed passage. However, I have found that markedly improved results are obtained by taking into consideration, in the formation of the feed passage size, the characteristics of internal flow (of the material being extruded) that may be attributed to a particular extruded or extruding system which is employed to force the material being extruded through the die.

More specifically, I have found that when employing ram-type extruders of the type shown in FIGURE 1, the forcing of the material to be extruded through the compression chamber through the screen plate is more or less uniform, and that this material is under more or less uniform pressure across the transverse dimension of the compression chamber. However, due to the friction between the material being extruded and the walls of the die body portion defining the compression chamber, there is sufficient heat generated about the periphery of the compression chamber to materially effect the degree of plasticization of the material being extruded. The result is that the material being extruded about the margin of the product flows more readily because it is somewhat hotter than the material forming the center portion of the product, which in turn makes difficult the formation of a truly uniform product. This can be controlled to some extent by employing the heat control concepts described in my said application Serial No. 554,688, but much more perfect results are obtained by suitably proportioning the border feed passages 44 with regard to the two factors mentioned above. In the illustrated embodiment, since a ram-type extruder is employed, the border feed passages 44, which are marked 44a, will be, in general, made somewhat less in cross-sectional area than the central feed passages that are marked 44b, as determined by the method described hereinafter.

These improvements permit the formation of product 22 with assurance that the walls of the products will be uniform and planar across the entire cross section of the product.

*Specific Description*

The operation of apparatus 10 may be substantially the same as that described in my copending application Serial No. 766,903, filed October 10, 1958, the disclosure of which is hereby incorporated by reference and of which this application is a continuation-in-part. In accordance with that application, the die body portion 23 is formed with a suitable opening 43 to which the channels 36 lead in guiding the stack of blocks or billets 30 into the compression chamber 21. The individual blocks 30 are formed with spaced upstanding ridges 90 that space the blocks somewhat from each other, and the individual blocks 30 have substantially the same cross section, transversely of the die, as the transverse cross-sectional configuration of the compression chamber 21. This permits succeeding blocks to be forced toward the product-forming structure with minimum friction.

The conveyor 17 is preferably of the type described in said application Serial No. 766,903, it including slats 92 that actually carry the product 22 and which in the form shown in FIGURE 1 are secured in any suitable manner to chains 94 trained over suitable sprockets 96. As said conveyor forms no part of the present invention, further description is believed unnecessary. As also described in said application Serial No. 766,903, the ram head 19, the chamber 21, the blocks 30, the screen portion 42, the extrusion passages 78, and the product all have substantially the same cross-sectional configuration transversely of the die. In the illustrated embodiment, the die structure is arranged so that two multi-tubular segments 22a and 22b are formed, but the same principles apply whether single or multiple product sections are provided.

The die body portion 23 may be formed from any suitable structure capable of withstanding the pressures applied to the material being extruded.

The main mounting plate 24 is secured to the front face 100 of the die body portion 23 by appropriate bolts 102 (see FIGURE 2) received in bolt holes 104 (see FIGURE 4) formed in the mounting plate. The opening 40 of the mounting plate is provided with divider portion 106 including diverging walls 108 that direct the material being extruded to either side of the center of the die. The rear face 32 of the mounting plate 24 may be formed with a groove 112 to receive an appropriate gasket 114 (see FIGURE 2). The forward side of the mounting plate 24 is formed with a plurality of conically rounded feed grooves 116 (see FIGURE 4) that are positioned to direct the material being extruded to the border screen plate feed passages 44a. The front face 25 of the mounting plate may also be formed with a suitable groove 118 adapted to receive an appropriate gasket 120.

The mounting plate 24 is also formed with upper and lower transversely extending passages 122 through which a heated fluid is passed in accordance with the invention described in my application Serial No. 554,688. The heated fluid, such as hot water, may be supplied to a conduit 126 which includes extensions 128 that supply the heated fluid to appropriate manifold structures 130 overlying the upstream ends of the respective pairs of passages 122. The heated fluid passes through these passages to similar manifold structures 132 (see FIGURE 3) at the other side of the die and thence to appropriate conduit 134 that carries the fluid away to a point of disposal. Preferably, the heated fluid is supplied to the conduit 126 as indicated by the arrows of FIGURE 1, both ends of conduit 126 being connected to a common source of supply. This insures an equal volume rate of flow to both the upper and lower pairs of passages 122. The manifold structures 130 and 132 may be secured in place by appropriate bolts 136 received in the respective bolt holes 138 (see FIGURE 4) of the mounting plate.

Figure 6:
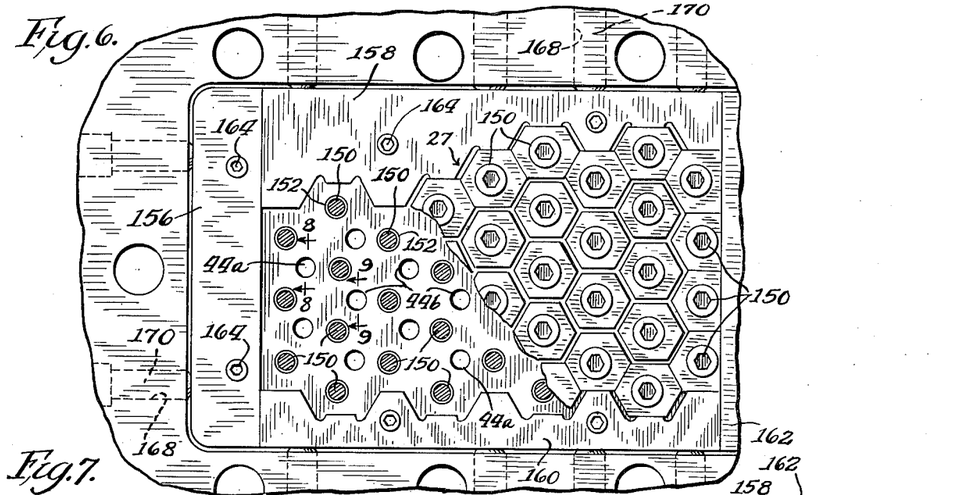
FIGURE 6 is an enlarged fragmental elevational view of the left hand portion of the die structure shown in FIGURE 3, with parts broken away.

The screen plate 26 is secured to the front face 25 of the mounting plate by appropriate bolts 140 which also secure the retainer plate 28 in position. Bolts 140 are received in tapped holes 142 (see FIGURE 4) formed in the mounting plate 24. In the illustrated embodiment, the screen plate 26 is recessed as at 144 and the cores 27 and marginal pieces 19 are mounted in this recessed portion. The individual cores 27a and 27b are secured in place by bolts 150 (see FIGURE 6) received in appropriate bolt holes 152 formed in the screen plate, bolts 150 passing through bores 153 (see FIGURE 10) formed in the individual cores. The marginal pieces indicated at 19, generally include end pieces 156 (see FIGURES 4 and 5), top pieces 158, bottom pieces 160, and a center piece 162. These marginal pieces are secured in abutting relation by appropriate bolts 164 (see FIGURES 6 and 7) received in appropriate bolt holes 166 formed in the screen plate. The screen plate is also formed with a plurality of transversely extending screw holes 168 that receive screws 170 which are turned against the respective marginal pieces. The front retainer plate 28 is spaced from the mounting plate 26 by screw threaded studs or spacers 172 received in appropriate tapped holes 174 formed in the screen plate.

The front retainer plate 28, in addition to the product openings 46, is formed with appropriate bolt holes 180 that receive the bolts 140 as well as passages 182 to which a fluid, such as hot water, is supplied in accordance with the invention of application Serial No. 554,668. As illustrated in FIGURE 1, the heated fluid may be supplied to the passages 182 by a common conduit 184 and is withdrawn from these passages at the other side of the die by a similar conduit (not shown). Preferably, the heated fluid is supplied in the direction of the arrows of FIGURE 1, both ends of conduit 184 being connected to a suitable common source of heated fluid. The front face 186 of the retainer plate 28 is formed with an upper groove 188 and a lower groove 190 which are closed at the front face of the retainer plate by welding appropriate metal elements 192 and 194 in place over the respective grooves. The groove 188 is placed in communication with the upper passage 182 by ports 196 while the groove 190 is placed in communication with the lower passage 182 by ports 198.

The heated fluid supplied to the main mounting plate 24 heats the screen plate 26 by conduction while all the marginal pieces 29 (elements 156, 158, 160, and 162) are heated by conduction from the front rentainer plate 28, as described in my application Serial No. 554,688. The studs 172 space the retainer plate 28 from the screen plate to prevent any substantial heat transfer between the retainer plate and the screen plate by conduction. As shown in FIGURE 2, the groove 188 formed in the front retainer plate is opposite the upper marginal pieces 158; the lower groove 190 is similarly located with respect to the marginal pieces 160 and the retainer plate 28 bears against all of the marginal pieces. Thus, the portions of the retainer plate 28 in contact with the marginal pieces receive much of the heat dissipated in the respective grooves 188 and 190.

As described in said application Serial No. 554,688 by controlling the temperature of the heated fluid entering main plate 124 and the front retainer plate 28, a more uniform and symmetrical product will be formed; experience has shown that the fluent material will not always pass from all portions of the extruding area at the same rate. For instance, it frequently happens that the fluent material emerging along the outside or border of the extruding area formed by the interconnected extruding passages will come out faster than that emerging at the center of the extruding area. I have found that wrinkles form on the outside walls of the product when this is happening. By admitting somewhat cooler water to the passage 182, the wrinkles cease, and then one can be sure that the fluent material is emerging from all portions of the extruding area at the same rate which provides the desired uniform and symmetrical product.

Sometimes it happens that the fluent material emerging along the outside or border of the extruding area from the interconnected extruding passages will come out slower than that emerging at the center of the extruding area. In this case, I have observed that wrinkles form on the inner walls of the product. By admitting somewhat warmer water to the passage 182, fluent material along the outside of the extruding area comes out faster, and the wrinkles cease.

This control can also be modified by controlling the temperature of the water entering the passages and recesses formed in the main plate 24. Thus, the fluent material at the top and bottom or along the respective sides of the compression chamber can be made to flow faster or slower into the screen plate as is necessary to provide a uniform product.

Figures 8, 9:
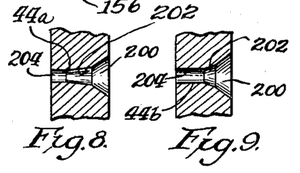
FIGURES 8 and 9 are diagrammatic fragmental cross-sectional views along lines 8—8 and 9—9 of FIGURE 6, respectively.

The specific configurations of feed passages 44a and 44b of the screen plate are diagrammatically illustrated in FIGURES 8 and 9 wherein it will be noted that both of these passages are provided with a frusto-conical entrance portion 200, a central frusto-conical portion 202 and a cylindrical exit portion 204. The frusto-conical portions 200 of the feed passages 44a and 44b are identical in taper and maximum dimension. The final relative lengths of the frusto-conical portions 202 are determined by the diameter of the respective portions 204 of the feed passages that will provide a uniform product of the configuration desired.

In the illustrated embodiment, the cylindrical portions 204 of the many of the border feed passages 44a are initially made somewhat smaller than their corresponding portions 204 of central feed passages 44b; these border feed passages supply the material being extruded to only two extrusion passages 78 (see FIGURE 7) so the volume feed of these passages is reduced proportionately. In addition, the final effective sizes of all the feed passages are proportioned to provide uniform feed as follows: The portions 204 are initially sized according to the volume distribution that is required to provide the product that is to be extruded by the die. Then the apparatus is operated without the cores and marginal pieces in place and the extruder is run at approximately the desired rate of production. The material being extruded emerges from the feed passages 44 in the form of rod-like elements, which, after a predetermined period, are individually cut off, weighed and numbered according to the particular feed passage or distributor hole 44. The weight of the respective rods is checked to see if it is actually in proportion to the required theoretical volume distribution of the material forming the product, and if it is not, the particular feed passage size is changed and the apparatus again retested until the volume distribution is uniform. Since it is difficult to make holes smaller, it is desirable to make the feed passages, and in particular the cylindrical portions 204, somewhat smaller than required initially and then increase the dimension of individual portions 204 as is necessary to bring all of the rod-like elements formed by the screen plate to an equivalent volume. The feed grooves 56 of cores 27 are then modified to make them define passages corresponding in size to the feed passages 44 that they are to form extensions of.

Thus, my present invention contemplates taking into consideration the flow impedance of the material being extruded when forming feed passage 44 to provide the volume flow desired.

As mentioned hereinbefore, in the illustrated embodiment, the friction between the material being extruded and the walls defining the compression chamber of the die body portion tends to heat somewhat the periphery of the body of material being extruded so that it tends to be somewhat more fluid about the periphery of the product than elsewhere. This means that the material being extruded will experience a somewhat more flow impedance at the central portion of the product being extruded than at its border. The central feed passages 44b will therefore ordinarily have to be enlarged somewhat, as determined by the test described immediately above to insure that the material actually extruded through each feed passage of the screen plate conforms to the actual volume requirements transversely of the die to provide a truly uniform product.

The configuration of the central cores 27a and border cores 27b defines the product that is formed by the apparatus 10. In the embodiment illustrated, the cores 27 are divided into two groups 210 and 212 (see FIGURE 3) that define the tube product sections shown in FIGURE 1.

Figure 7:
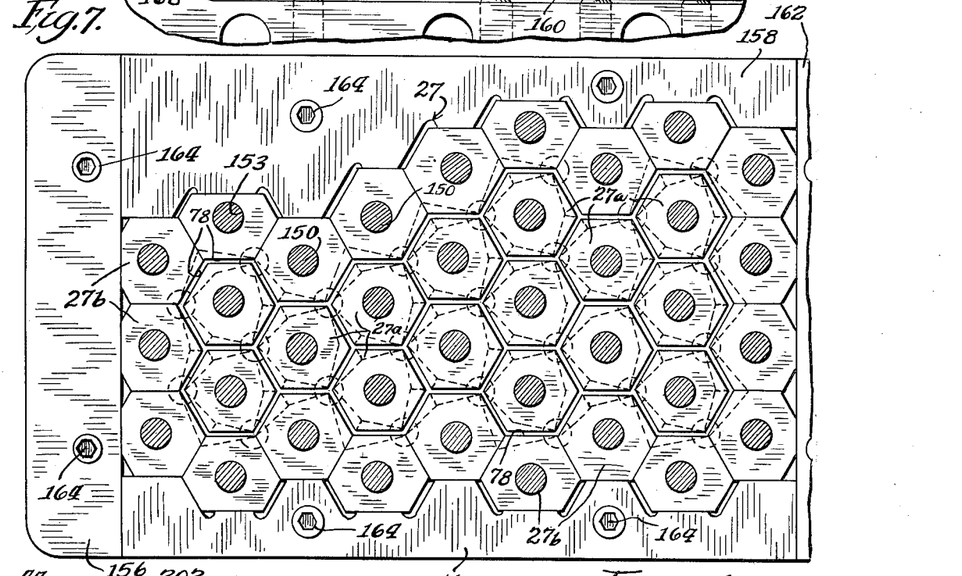
FIGURE 7 is a view similar to that of FIGURE 6, but further enlarged to indicate some of the details of the individual cores forming a part of the improved die structure.
Figure 13:
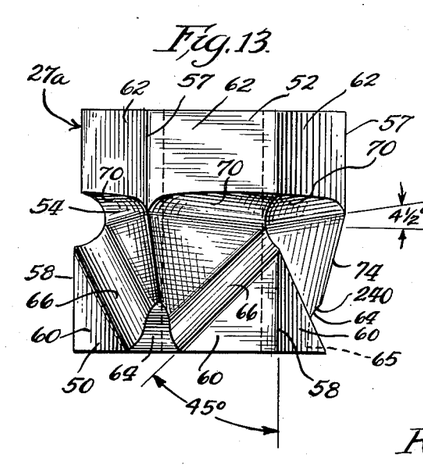
FIGURE 13 is a side elevational view of the core structure shown in FIGURE 11.
Figure 14:
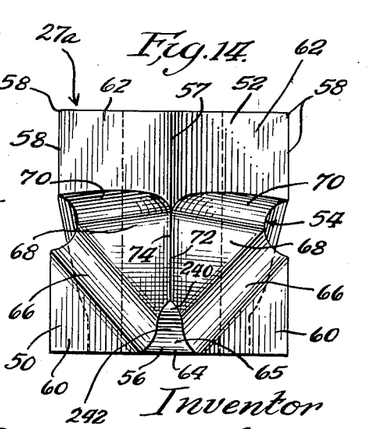
FIGURE 14 is a side elevational view of the core element shown in FIGURE 13, taken from the right hand side of FIGURE 13.

FIGURES 7 and 10 diagrammatically illustrate the cooperation between the adjacent cores 27 to define the passages that receive and shape the material being extruded. It has already been pointed out that many of the border feed passages 44a of the screen plate supply the material being extruded only to two of the interconnected extrusion passages defined by the cores. The size of the curved walls 64 of the feed grooves 56 of the central cores 27a adjacent border cores 27b are made to correspond with the size of the border core feed groove walls 64 that they complement. As indicated in FIGURE 13, the curved surfaces 66 in the illustrated embodiment are formed at an angle of 45 degrees with respect to the longitudinal axis of the die while the curved surfaces 70 are formed at an angle of 4½ degrees from a transverse plane passing through the center of the core waist groove 54. Certain of the planar surfaces 80 of the border cores 27b will be formed with a curved recess 220 at the convergence of the curved surfaces 66 and 70 at the sides of these cores that are adjacent centrally disposed cores 27a, while certain other surfaces 80 of said cores 27b will be formed with curved recesses 221 in part defining adjacent core feed grooves 56.

The material extruded may be the rubber-like compound mentioned in my said copending applications, an illustrative formula or recipe for which is as follows:

|  | Parts | Made by— |
| --- | --- | --- |
| Hycar 1043 | 100.0 | B. F. Goodrich Chemical Co. |
| Zinc Oxide (#42 Green Label) | 5.0 | St. Joseph Lead Co. |
| Sulfur (Spider or Blackbird) | 0.5 | C. P. Hall Co. |
| FEF Black (Philblack A) | 100.0 | Phillips Petroleum Co. |
| GP-261 | 10.0 | B. F. Goodrich Chemical Co. |
| TMTD (Methyl Tuads) | 2.0 | R. T. Vanderbilt Co. |
| Santocure | 1.0 | Monsanto Chemical Co. |
| Stearic Acid | 1.0 | Binney & Smith Co. |

Hycar 1043 is a copolymer of butadiene and acrylonitrile (medium acrylonitrile type). Philblack A is a fast extrusion furnace carbonblack. GP–261 is dioctyl phthalate. Methyl Tuads are tetramethyl thiuram disulfide. Santocure is N-cyclohexyl-2-benzothiazole sulfenamide.

When the multi-tube structures according to the invention are to be used for cushions and similar structures not exposed to oil, rubber of the usual composition will be satisfactory. When the multi-tube structures are for building or insulating, the fluent composition will be selected from the customary asphaltic and bituminous base, gypsum, and other earth. The illustrated product is particularly adapted for use as a resilient core in journal box packings.

The hexagonal multiple tube structure illustrated is preferred because it presents extraordinary ability to resist pressure and to recover after being relieved, but there are uses in which other shapes will be satisfactory or preferred. The product 22 is in effect, composed of a stack of like parallel tubes in which each tube has wall portions in common with other tubes and integral with them at adjoining corners. The extruded cellular product is entirely integral and the distribution of material provides an extremely light, springy element with a strong resistance to deforming under pressure and a high recovery upon release, even after being compressed for a long time under adverse temperature conditions.

The plates 24, 26 and 28 are formed from a suitable material such as stainless steel. The cores are readily made from commercial bar stock of a like material reduced to form the head portions, shaped to form the various grooves, ground on the face of the bases and hardened to insure accuracy and long wear. The marginal pieces may be formed from like materials.

While the illustrated embodiment has been shown in association with a ram-type extruder, I contemplate that the die structure illustrated may be used in association with extrusion apparatus that will provide a continuous extrusion, such as screw-type extruders. When this is done, the operation of the machine is substantially the same except that the product continually emerges from the die under the action of the screw-type extruder. Such extruders will effect the proportioning of the feed passages 44 in the screen plate, since there is a tendency for the material being extruded to become more heated at its central portion than at its border. This means that when screw-type extruders are employed, the border feed passages may be somewhat larger in size than the central feed passages, though the actual proportioning used will be dictated by the same test outlined above.

In a tested and proven embodiment, central cores 27a are each 0.593 inch long (longitudinally of the extruder) and measure 0.593 between opposed planar sides of base portion 50 (transversely of the extruder); the faces of the head portions 52 are ground to provide a product wall thickness of .029 inch. Curved surfaces 66 are struck on an arc having a radius of .062 inch while curved surfaces 70 are struck on an arc having a radius of 1/32 inch. Surface 64 includes a cylindrical surface 65 which merges into concave surface 240 at approximately point 242, which in said proven embodiment is .044 inch from the end of the base portion 50. The border cores 27b and the marginal pieces 19 are proportioned to complement the central cores.

In the screen plate 26, cylindrical portions 204 of the feed passages 44 that feed to three sides of a core are initially sized on the order of .228 inch diameter, while the portions of the feed passages that feed to only two sides of a core are initially sized on the order of .188 inch; the final sizes employed are determined by the test described above.

The mounting plate 24 is 14 inches long, 3⅜ inches thick and stands 10 inches high, while the screen plate 26 is 14 inches long, 7 inches in height and 1½ inches in thickness. The marginal pieces 19 when assembled as the unit shown in FIGURES 4 and 5 provide a unit 11.063 inches long and 3.563 inches high, which is received in recess 144 that is 11.125 inches in length, 3.625 inches in height and .5175 in depth. Marginal pieces 19 are .782 in thickness. Retainer plate 28 is 14 inches long, 7 inches high and 1½ inches thick. The heated fluid passages of plates 24 and 28 may be proportioned as is necessary to give the results desired for a particular product being extruded.

The foregoing description and the drawings are given merely to explain and illustrate my invention and the invention is not to be limited thereto, except insofar as the appended claims are so limited, since those skilled in the art who have my disclosure before them will be able to make modifications and variations therein without departing from the scope of the invention.

I claim:
1. A die for extruding multiple tube structures having integrally united walls comprising a group of cores of generally polygonal cross section, each of said cores including a relatively large base portion and a relatively small head portion separated by a reduced waist portion, said head and base portions of each core having similar polygonal configurations, said base portions of adjacent cores having faces in contact across the group of cores, said faces terminating in corners and said head portions being formed with like faces and corners that are spaced to define interconnected extrusion passages, said group of cores comprising perimeter cores arranged about the remaining cores, with alternate corners of said base portions of said remaining cores being excised to form feed grooves that complement like feed grooves of adjacent remaining cores to define feed passages that diverge in the direction of said waist portions, said waist portions defining an interconnected pooling area, and with the corners of said perimeter cores opposite the excised corners of adjacent of said remaining cores being similarly excised to define with the adjacent remaining cores border feed passages that diverge in the direction of said waist portions, the abutting faces of adjacent perimeter core head and base portions being coplanar whereby the perimeter cores define the perimeter of the multiple tube structure.

2. The die set forth in claim 1 wherein said feed grooves each comprise opposite side portions diverging in the direction of said waist portions, said side portions merging along said alternate corners respectively in portions that taper radially outwardly of each core in the direction of material flow through said feed passages, whereby uniform material flow to all corners of the respective cores is provided.

References Cited in the file of this patent

UNITED STATES PATENTS

| | | |
|---|---|---|
| 1,152,978 | Royle | Sept. 7, 1915 |
| 2,597,638 | Higbe | May 20, 1952 |
| 2,908,037 | Harkenrider | Oct. 13, 1959 |

FOREIGN PATENTS

| | | |
|---|---|---|
| 1,117,397 | France | Feb. 20, 1956 |